(12) United States Patent
Nichols et al.

(10) Patent No.: US 12,184,053 B2
(45) Date of Patent: *Dec. 31, 2024

(54) WIRE TENSIONING SYSTEM

(71) Applicant: Altec Industries, Inc., Birmingham, AL (US)

(72) Inventors: Robert Nichols, Saint Joseph, MO (US); David Lindquist, Cameron, MO (US); William Naber, Saint Joseph, MO (US); Cole Schlup, Savannah, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,438

(22) Filed: May 15, 2023

(65) Prior Publication Data

US 2024/0039265 A1 Feb. 1, 2024

Related U.S. Application Data

(63) Continuation of application No. 17/875,943, filed on Jul. 28, 2022, now Pat. No. 11,689,008.

(51) Int. Cl.
*H02G 1/04* (2006.01)
*H02G 7/02* (2006.01)

(52) U.S. Cl.
CPC ............. *H02G 7/02* (2013.01); *H02G 1/04* (2013.01)

(58) Field of Classification Search
CPC .......... H02G 7/02; H02G 1/04; B66C 23/701
USPC ................................ 294/132, 133, 134, 135
See application file for complete search history.

(56) References Cited

U.S. PATENT DOCUMENTS

| | | | |
|---|---|---|---|
| 1,050,004 | A | 1/1913 | Jeremiah |
| 2,662,730 | A | 12/1953 | Crawford |
| 4,937,759 | A | 6/1990 | Vold |
| 5,076,449 | A | 12/1991 | Clutter |
| 5,105,367 | A | 4/1992 | Tsuchihashi et al. |
| 5,215,202 | A | 6/1993 | Fujimoto |

(Continued)

FOREIGN PATENT DOCUMENTS

| | | |
|---|---|---|
| CN | 108789416 A | 11/2018 |
| CN | 113902990 A | 1/2022 |

(Continued)

OTHER PUBLICATIONS

PCT Patent Application PCT/US2023/028564 International Search Report and Written Opinion of the International Searching Authority, issued Nov. 22, 2023.

(Continued)

*Primary Examiner* — Paul T Chin
(74) *Attorney, Agent, or Firm* — Erise IP, P.A.

(57) ABSTRACT

Systems and methods for tensioning an electrical cable adapted to be manipulated by one or more remotely operated robotic appendages. Tensioners mounted to a rigid object configured to adjust the tension of a connecting line attached to an electrical cable such that the tension of the connecting line is applied to a length of the electrical cable such that another portion of the electrical cable becomes slack, thereby allowing one or more robotic appendages to remove, replace, repair, or conduct any alteration or modification to said electrical cable or to a rigid object that supports the electrical cable.

20 Claims, 7 Drawing Sheets

(56) References Cited

U.S. PATENT DOCUMENTS

| | | | |
|---|---|---|---|
| 5,286,159 A | | 2/1994 | Honma |
| 5,782,440 A | * | 7/1998 | Ozga .................. H02G 3/26 248/58 |
| 6,325,749 B1 | * | 12/2001 | Inokuchi .............. H02G 1/02 182/2.11 |
| 6,453,776 B1 | * | 9/2002 | Beattie ................ H01R 13/53 294/174 |
| 7,817,444 B2 | * | 10/2010 | Dennes ................ H04Q 1/06 361/825 |
| 8,684,333 B2 | * | 4/2014 | Devine ................ H02G 1/04 182/2.1 |
| 9,203,219 B2 | | 12/2015 | Devine et al. |
| 9,707,680 B1 | | 7/2017 | Jules et al. |
| 9,727,053 B2 | | 8/2017 | Ito |
| 10,105,853 B1 | | 10/2018 | Hwang et al. |
| 10,589,433 B2 | | 3/2020 | Nahwi et al. |
| 10,626,632 B2 | | 4/2020 | Sauber et al. |
| 11,114,834 B2 | * | 9/2021 | Yao .................... H02G 7/18 |
| 11,660,750 B1 | | 5/2023 | Sykes et al. |
| 11,689,008 B1 | * | 6/2023 | Nichols ................ H02G 7/02 254/134.5 |
| 11,697,209 B1 | | 7/2023 | Mourlam et al. |
| 11,717,969 B1 | | 8/2023 | Mourlam et al. |
| 11,742,108 B1 | | 8/2023 | Naber et al. |
| 11,749,978 B1 | | 9/2023 | Lindquist et al. |
| 11,794,359 B1 | * | 10/2023 | Sykes .................. H04N 23/62 |
| 11,839,962 B1 | * | 12/2023 | Nichols ............... B25J 9/1697 |
| 2001/0055525 A1 | | 12/2001 | Inokuchi et al. |
| 2002/0179559 A1 | | 12/2002 | Hashiguchi et al. |
| 2003/0029215 A1 | | 2/2003 | Latour |
| 2004/0112207 A1 | | 6/2004 | Price |
| 2004/0182235 A1 | | 9/2004 | Hart |
| 2007/0124024 A1 | | 5/2007 | Okamoto et al. |
| 2007/0291128 A1 | | 12/2007 | Wang et al. |
| 2008/0188986 A1 | | 8/2008 | Hoppe |
| 2009/0088773 A1 | | 4/2009 | Zhao et al. |
| 2009/0088897 A1 | | 4/2009 | Zhao et al. |
| 2011/0036605 A1 | | 2/2011 | Leong et al. |
| 2011/0245844 A1 | | 10/2011 | Jinno |
| 2011/0256995 A1 | | 10/2011 | Takazakura et al. |
| 2013/0011220 A1 | | 1/2013 | Jacobsen et al. |
| 2013/0014852 A1 | | 1/2013 | Hayden et al. |
| 2013/0313042 A1 | | 11/2013 | Freeman et al. |
| 2014/0094968 A1 | | 4/2014 | Taylor et al. |
| 2016/0239080 A1 | | 8/2016 | Marcolina et al. |
| 2017/0289445 A1 | | 10/2017 | Kumar et al. |
| 2018/0243921 A1 | * | 8/2018 | Hashimoto ............. B25J 13/00 |
| 2019/0125462 A1 | | 5/2019 | Peine et al. |
| 2019/0176334 A1 | | 6/2019 | Zhou et al. |
| 2019/0201136 A1 | | 7/2019 | Shelton, IV et al. |
| 2019/0256335 A1 | | 8/2019 | Araki |
| 2019/0257097 A1 | | 8/2019 | Kawai et al. |
| 2020/0122321 A1 | | 4/2020 | Khansari Zadeh et al. |
| 2020/0302207 A1 | | 9/2020 | Perkins et al. |
| 2021/0001483 A1 | | 1/2021 | Milenkovic |
| 2021/0020337 A1 | | 1/2021 | Ciapala et al. |
| 2021/0106342 A1 | | 4/2021 | Blackwell |
| 2021/0252714 A1 | | 8/2021 | Hayashi et al. |
| 2021/0269291 A1 | * | 9/2021 | Callaghan ............. H02G 1/04 |
| 2021/0273424 A1 | | 9/2021 | Harvey et al. |
| 2021/0282871 A1 | | 9/2021 | Prior et al. |
| 2021/0315590 A1 | | 10/2021 | Chappuis et al. |
| 2021/0370509 A1 | | 12/2021 | Pivac |
| 2022/0032476 A1 | | 2/2022 | Robertson |
| 2022/0138612 A1 | | 5/2022 | Vengertsev et al. |
| 2022/0203562 A1 | | 6/2022 | Brown et al. |
| 2022/0212340 A1 | | 7/2022 | Hasegawa et al. |
| 2022/0212345 A1 | | 7/2022 | Smith et al. |
| 2022/0241975 A1 | | 8/2022 | Tan et al. |
| 2022/0266449 A1 | | 8/2022 | Hasegawa et al. |
| 2022/0287676 A1 | | 9/2022 | Steines et al. |
| 2022/0288669 A1 | | 9/2022 | Goodall et al. |
| 2022/0383531 A1 | | 12/2022 | Santini et al. |
| 2023/0046644 A1 | | 2/2023 | Themelis |
| 2023/0157525 A1 | | 5/2023 | Hunter et al. |
| 2023/0200920 A1 | | 6/2023 | Mittman |
| 2023/0270321 A1 | | 8/2023 | Breton et al. |

FOREIGN PATENT DOCUMENTS

| | | |
|---|---|---|
| JP | 6840052 | 3/2021 |
| KR | 102207182 B1 | 1/2021 |
| WO | 1995032078 A1 | 11/1995 |
| WO | 2017220822 A1 | 12/2017 |
| WO | 2020203793 A1 | 10/2020 |

OTHER PUBLICATIONS

U.S. Appl. No. 17/875,674, filed Jul. 28, 2022, Jonathan Westin Sykes.
U.S. Appl. No. 17/875,796, filed Jul. 28, 2022, Robert Nichols.
U.S. Appl. No. 17/875,821, filed Jul. 28, 2022, William Naber.
U.S. Appl. No. 17/875,990, filed Jul. 28, 2022, David F. Lindquist.
Aracil et al. "Teleoperated system for live power lines maintenance" Div. Ingenieria de Sistemas y Automatica (DISAM), Polytechnic University of Madrid, Spain.
IStock, "Lineman hanging new "pot" aka transformer on telephone pole stock photo", Apr. 22, 2016, https://www.istockphoto.com/photo/lineman-hanging-new-pot-aka-transformer-on-telephone-pole-gm951987990-259883755 (Year: 2016).
Owen-Hill, "3 types of robot singularities and how to avoid them," Mar. 2, 2016, Robohub.org, https://robohub.org/3-types-of-robot-singularities-and-how-to-avoid-them/ (Year: 2016).
U.S. Appl. No. 18/368,155 Non-Final Office Action issued Jun. 21, 2024.
U.S. Appl. No. 17/875,990, Notice of Allowance dated Apr. 21, 2023.
U.S. Appl. No. 17/875,674, Final Office Action dated Feb. 15, 2023.
U.S. Appl. No. 17/875,674, Non-Final Office Action dated Oct. 13, 2022.
U.S. Appl. No. 17/875,674, Notice of Allowance and Interview Summary dated Jun. 16, 2023.
U.S. Appl. No. 17/875,743, Final Office Action dated Jan. 10, 2023.
U.S. Appl. No. 17/875,743, Non-Final Office Action dated Sep. 22, 2022.
U.S. Appl. No. 17/875,743, Notice of Allowance and Interview Summary dated Mar. 27, 2023.
U.S. Appl. No. 17/875,796, Non-Final Office Action dated Apr. 5, 2023.
U.S. Appl. No. 17/875,796, Notice of Allowance dated Aug. 2, 2023.
U.S. Appl. No. 17/875,990, Non-Final Office Action dated Feb. 9, 2023.
U.S. Appl. No. 18/385,545 Notice of Allowance issued Jul. 15, 2024.
U.S. Appl. No. 18/135,941 Non-Final Office Action issued Aug. 16, 2024.
U.S. Appl. No. 18/224,278 Non-Final Office Action issued Sep. 5, 2024.
U.S. Appl. No. 18/368,155 Notice of Allowance issued Oct. 29, 2024.

* cited by examiner

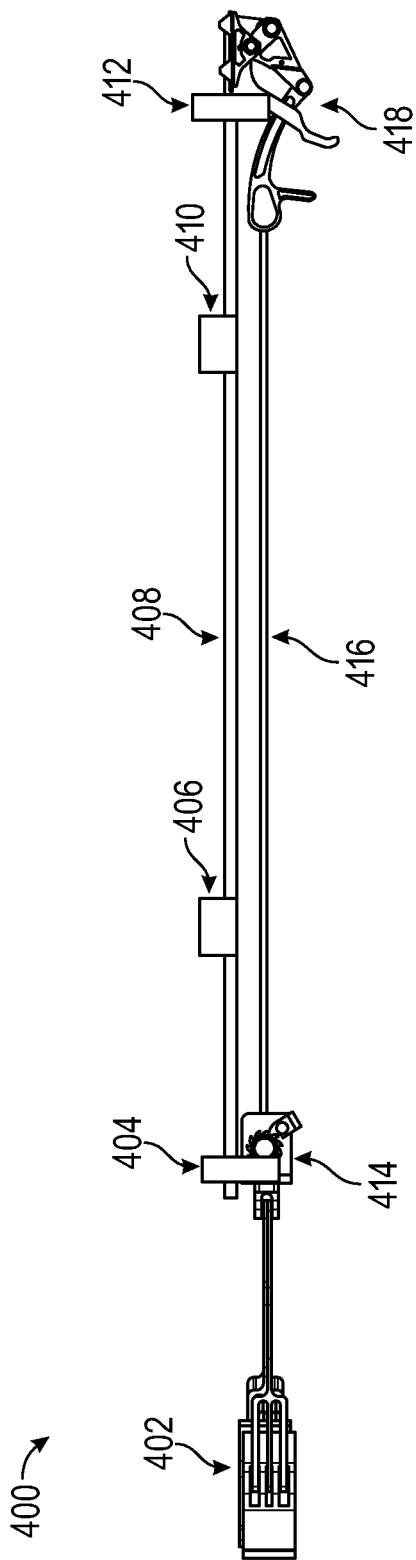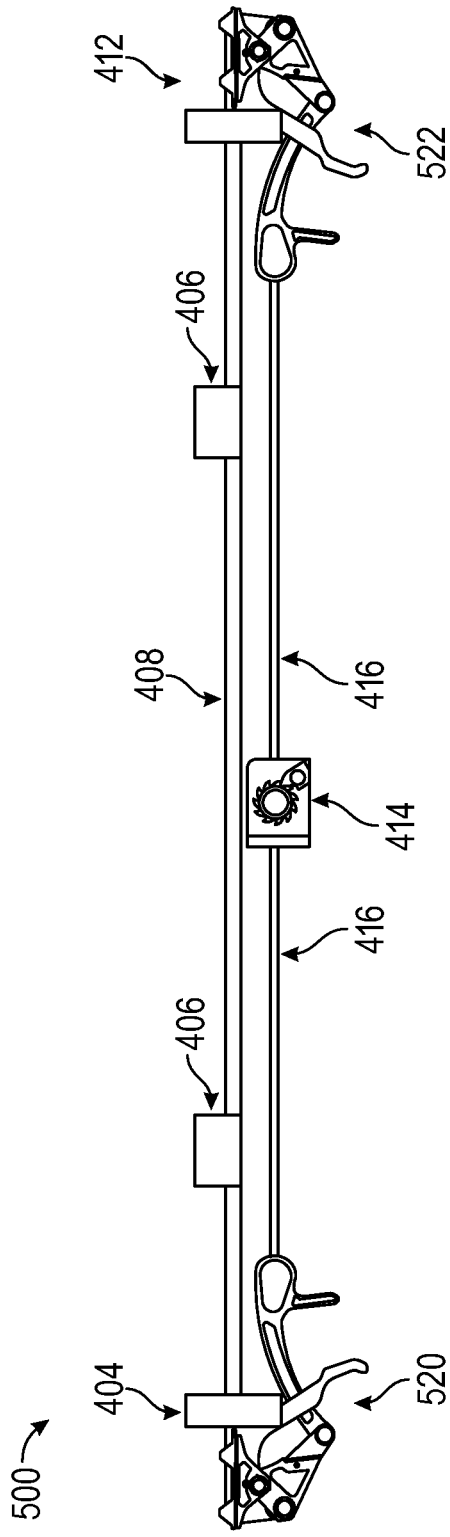

WIRE TENSIONING SYSTEM

RELATED APPLICATIONS

This patent application is a continuation application claiming priority benefit, with regard to all common subject matter, of commonly assigned and concurrently filed U.S. patent application Ser. No. 17/875,943, filed Jul. 28, 2022, and entitled "WIRE TENSIONING SYSTEM." The above-referenced patent application is hereby incorporated by reference in its entirety into the present application.

BACKGROUND

1. Field

Embodiments of the invention relate to wire tensioning systems. More specifically, embodiments of the invention relate to wire tensioning systems adapted for electrical utility applications.

2. Related Art

Typically, a lineman uses a ratchet strap and clamp to tension an electrical cable in order to replace or remove a dead-end insulator. This process involves applying a tensioning force to the electrical cable such that the dead-end insulator may be removed without accidentally letting the live powerline fall out of control of the lineman. In current systems, preventing this from occurring is achieved with a series of clamps and ratchet straps. The ratchet strap is connected to a utility pole and held fast while the clamp is attached to an electrical cable. The ratchet strap is then tightened to tension the electrical cable. These ratchet straps and clamps require skill to handle and often require more dexterity than two hands provide. In some cases, remotely operated equipment controlled by an operator may be elevated to the electrical cable instead of a lineman. The remotely operated equipment removes the lineman from the work area. However, existing ratchet systems are not suitable for use by remotely operated equipment. They possess the same lack of dexterity that linemen possess when using the ratchet straps and clamps to tension the electrical cable.

SUMMARY

Embodiments solve the aforementioned problems by providing systems and methods for tensioning an electrical cable and maintaining tension on said electrical cable. Tensioners fixed to a rigid object may be configured to adjust the tension of a connecting line fixed to an electrical cable such that a length of the electrical cable between the rigid object and the clamp becomes slack while tension is maintained in another portion of the electrical cable such that one or more robotic appendages may remove, replace, repair, or conduct any alteration or modification to said slack electrical cable and the connection of the electrical cable to a rigid object (e.g., a utility pole or utility pole cross-arm) such as a dead-end insulator.

In some embodiments, the wire tensioning system comprises a mount, a tensioner, a connecting line, a clamp, and a supporting structure with suspension mediums. In some such embodiments, the wire tensioner is adapted to be hanged from an electrical cable by said suspension mediums. In the wire tensioning system, the tensioner interfaces with the connecting line and adjusts the tension thereof. The connecting line, fixed to the clamp, in turn tensions the electrical cable which allows the one or more robotic appendages remove, repair, replace, or perform any alteration or modification upon the electrical cable and a connection of the electrical cable to a rigid object (e.g., a utility pole or utility pole cross-arm) such as a dead-end insulator.

In some embodiments the wire tensioning system comprises two clamps disposed at a first and second end of a supporting structure. The system further comprises a connecting line between the two clamps including a tensioner fixed along the length of the connecting line. This tensioner is adapted to be operated by one or more robotic appendages and serves the function of adjusting the tension of the connecting line which in turn adjusts the tension of the electrical cable attached to by the first and second clamp.

In further embodiments, the wire tensioning system comprises a connecting line, a mount, a clamp, and a tensioner. The clamp and mount are disposed at a first and second end of the connecting line. In such an embodiment, the connecting line is adapted to provide structural support to the wire tensioning system and is adapted to interface with a gearbox within the tensioner. The tensioner is disposed below the mount and interfaces with the connecting line such that the tensioner draws the connecting line towards the tensioner thereby adjusting the tension of the electrical cable. The mount is adapted to be mounted to a rigid object such that the wire tensioning system requires no additional support.

In a first embodiment, the techniques described herein relate to a wire tensioning system adapted to be manipulated by one or more robotic appendages for maintaining tension in an electrical cable, the wire tensioning system including a supporting structure with a plurality of suspension mediums attached along a length of the supporting structure, wherein the supporting structure is hanged from the electrical cable via the plurality of suspension mediums, a mount disposed at a first end of the supporting structure for attaching the wire tensioning system to a rigid object, a clamp disposed at a second end of the supporting structure, the clamp adapted to attach the wire tensioning system to the electrical cable, wherein the clamp is adapted to be manipulated by the one or more robotic appendages, a connecting line between the mount and the clamp that allows the clamp to be drawn towards the mount, and a tensioner adapted to interface with the one or more robotic appendages such that the one or more robotic appendages operate the tensioner to adjust the tension of the connecting line between the mount and the clamp, wherein the tensioner is disposed below the supporting structure allowing the tensioner to move freely along the length of the supporting structure.

In a second embodiment, the techniques described herein relate to the wire tensioning system of the first embodiment, further including a first slidable sleeve disposed over the supporting structure coupling the clamp to the supporting structure.

In a third embodiment, the techniques described herein relate to the wire tensioning system of the first and second embodiments, further including a second slidable sleeve disposed over the supporting structure coupling the mount to the supporting structure.

In a fourth embodiment, the techniques described herein relate to the wire tensioning system of the first through the third embodiments, wherein the plurality of suspension mediums includes hooks adapted to be placed over the electrical cable.

In a fifth embodiment, the techniques described herein relate to the wire tensioning system of the first through the fourth embodiments, wherein the tensioner includes a ratchet coupled to the connecting line.

In a sixth embodiment, the techniques described herein relate to the wire tensioning system of the first through the fifth embodiments, wherein the connecting line is a ratchet strap associated with the ratchet of the tensioner.

In a seventh embodiment, the techniques described herein relate to the wire tensioning system of the first through the sixth embodiments, wherein the mount is adapted to be attached to a utility pole.

In an eighth embodiment, the techniques described herein relate to a wire tensioning system adapted to be manipulated by one or more robotic appendages for maintaining tension in an electrical cable, the wire tensioning system including a connecting line adapted to provide structural support to the wire tensioning system, a mount disposed at a first end of the connecting line for attaching the wire tensioning system to a rigid object, a clamp disposed at a second end of the connecting line, the clamp adapted to attach the wire tensioning system to the electrical cable, the clamp adapted to be manipulated by the one or more robotic appendages, and a tensioner adapted to interface with the one or more robotic appendages such that the one or more robotic appendages operate the tensioner to adjust the tension of the electrical cable using the tensioner, wherein the tensioner is disposed below the mount.

In a ninth embodiment, the techniques described herein relate to the wire tensioning system of the eighth embodiment, wherein the connecting line includes a threaded section disposed at a first end of the connecting line, and an insulated section disposed at a second end of the connecting line.

In a tenth embodiment, the techniques described herein relate to the wire tensioning system of the eighth and ninth embodiments, wherein the threaded section of the connecting line interfaces with the tensioner.

In an eleventh embodiment, the techniques described herein relate to the wire tensioning system of the eighth through the tenth embodiments, wherein the insulated section is coupled to the clamp.

In a twelfth embodiment, the techniques described herein relate to the wire tensioning system of the eighth through the eleventh embodiments, wherein the threaded section is adapted to allow the tensioner to draw the clamp towards the tensioner.

In a thirteenth embodiment, the techniques described herein relate to the wire tensioning system of the eighth through the twelfth embodiments, wherein the connecting line includes a linear gear acting as a rack in a rack and pinion gear arrangement.

In a fourteenth embodiment, the techniques described herein relate to the wire tensioning system of the eighth through the thirteenth embodiments, wherein the tensioner includes a pinion gear adapted to interface with the one or more robotic appendages, wherein the pinion gear interfaces with the linear gear of the connecting line in the rack and pinion gear arrangement.

In a fifteenth embodiment, the techniques described herein relate to a wire tensioning system adapted to be manipulated by one or more robotic appendages for maintaining tension in an electrical cable, the wire tensioning system including a supporting structure with a plurality of suspension mediums disposed along a length of the supporting structure, a first clamp disposed at a first end of the supporting structure, a second clamp disposed at a second end of the supporting structure, wherein the first clamp and the second clamp are adapted to attach the wire tensioning system to the electrical cable, a connecting line disposed between the first clamp and the second clamp, and a tensioner disposed along the length of the connecting line between the first clamp and the second clamp, the tensioner adapted to interface with the one or more robotic appendages such that the one or more robotic appendages operate the tensioner to adjust a tension of the connecting line to draw the first clamp towards the second clamp.

In a sixteenth embodiment, the techniques described herein relate to the wire tensioning system of the fifteenth embodiment, wherein the tensioner includes a ratchet adapted to interface with the one or more robotic appendages.

In a seventeenth embodiment, the techniques described herein relate to the wire tensioning system of the fifteenth and sixteenth embodiments, wherein the connecting line is a ratchet strap interfacing with the ratchet of the tensioner.

In an eighteenth embodiment, the techniques described herein relate to the wire tensioning system of the fifteenth through the seventeenth embodiments, wherein the supporting structure and the connecting line include one or more lengths of dielectric material providing electrical insulation between the first clamp and the second clamp.

In a nineteenth embodiment, the techniques described herein relate to the wire tensioning system of the fifteenth through the eighteenth embodiments, wherein the first clamp and the second clamp are coupled to the supporting structure by a first slidable sleeve and a second slidable sleeve respectively.

In a twentieth embodiment, the techniques described herein relate to the wire tensioning system of the fifteenth through the nineteenth embodiments, further including a slidable sleeve coupling the tensioner and the supporting structure, wherein the slidable sleeve is disposed between the first clamp and the second clamp along the length of the supporting structure.

Furthermore, some embodiments include a wire tensioning system adapted to be manipulated by one or more robotic appendages. Said wire tensioning system may further comprise an electronic system for operating the wire tensioning system after it has been installed without physically interfacing with the one or more robotic appendages. The electronic control system may comprise a processor, computer readable memory, a plurality of sensors, a wire tension measurement system, motors to actuate the wire tensioner and clamps, a wireless receiver and transmitter, and one or more battery modules. The electronic control system may be wirelessly commanded to operate the wire tensioning system via a wireless network or, in the alternative, it may be commanded through a wired connection via a wired network.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 4 depicts a wire tensioning system comprising a rigid supporting structure and suspension mediums relating to some embodiments;

FIG. 5 depicts a wire tensioning system comprising two clamps arranged at opposing ends of a rigid supporting structure and a tensioner disposed between said clamps relating to some embodiments;

Figure 1:
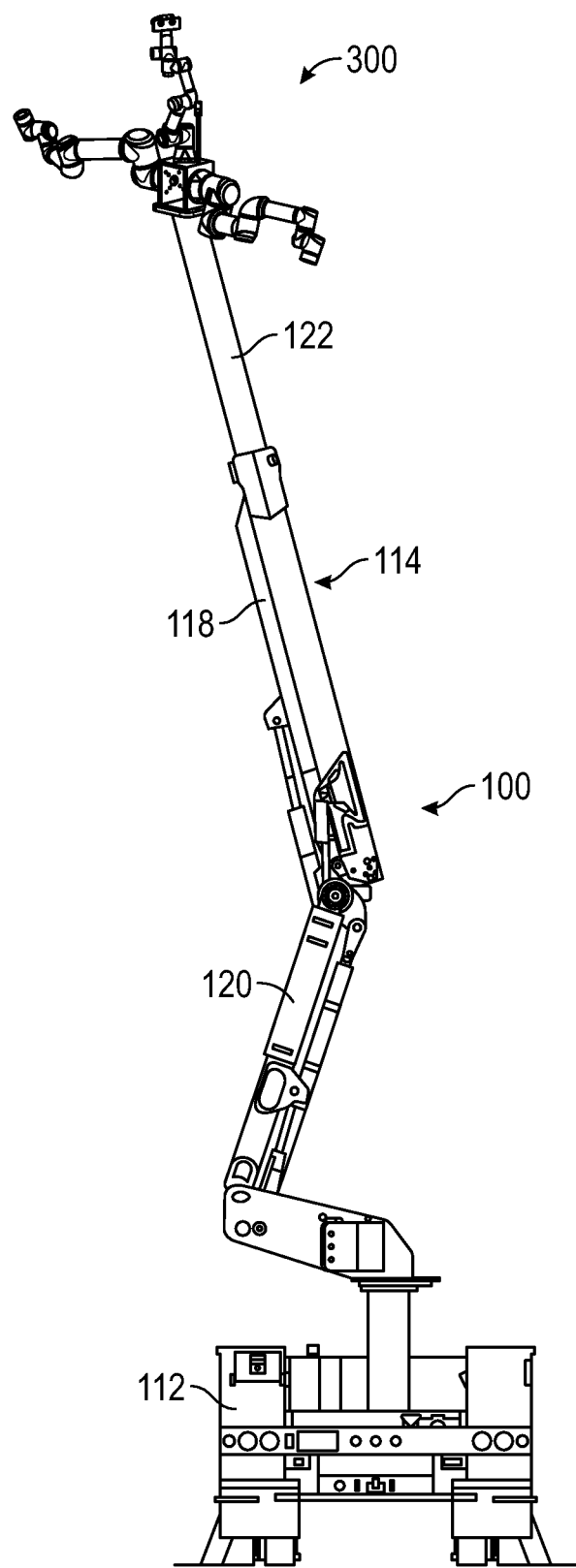
FIG. 1 depicts an aerial device relating to some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, embodiments of the current disclosure relate to systems and methods for directly adjusting the tension of an electrical conductor or cable by one or more robotic appendages to create a length of slack cable that allows the one or more robotic appendages to perform removal, replacement, repair, or any other form of alteration or modification to the slack cable and the slack cable's connection to the rigid object (e.g., a utility pole or utility pole cross-arm) such as a dead-end insulator. A wire tensioning system may be operably connected to one or more robotic appendages. Embodiments of the present disclosure provide a tensioner arranged with mounts, clamps, a connecting line, and a rigid supporting structure to form a wire tensioning system for maintaining tension in an electrical cable or conductor, the wire tensioning system is adapted to be installed, operated, and uninstalled by one or more robotic appendages.

In some embodiments, the wire tensioning system includes a rigid supporting structure that is hanged from an electrical cable or conductor. In other embodiments the supporting structure may be incorporated into the connecting line. In other embodiments, the wire tensioning system may be entirely rigid itself and is mounted to a rigid object. The tensioner may comprise any sort of tensioning device such as a ratchet, a hydraulic piston, a fixed displacement apparatus, a weighted mass, a rack and pinion, or the like. The tensioner may be disposed along a connecting line or coupled to a mount. The connecting line may comprise a ratchet strap, a steel cable, a metal rod, a threaded rod, a rope, a linear gear, and the like. In some embodiments, the connecting line further comprises one or more lengths of dielectric material such as composite fiberglass, silicone, glass, rubber, plastics, and the like such that a first and second end of the connecting line are electrically isolated from each other. The connecting line may be disposed between the mount and clamp, or may be disposed between a first and second clamp. In certain embodiments two clamps may be disposed at a first and second end of a supporting structure. In other embodiments, a clamp may be disposed at an end of the supporting structure opposite of the mount.

FIG. 1 depicts an aerial device 100 relating to some embodiments. The aerial device 100 comprises a utility vehicle 112, a boom assembly 114, and a remote assembly system 300. The boom assembly 114 comprises a boom 118 having a boom proximal end 120 and a boom distal end 122. In some embodiments, the boom 118 is one of a telescoping boom and an articulating boom. The boom assembly 114 may be attached to the utility vehicle 112 at the boom proximal end 120. The remote assembly system 300 may be secured to the boom distal end 122, such that the remote assembly system 300 is supported by the boom assembly 114. In some embodiments, and as described in greater detail below, the remote assembly system 300 may comprise at least a robot unit adapted for performing telecommunications repair, powerline repair, general repair work, or other actions that may be performed by a robot. For example, the robot unit may comprise one or more utility tools for performing actions such as sawing, cutting, screwing, wiring, or other actions associated with repair work. In some embodiments, the boom 118 is used to position the remote assembly system 300 in a remote location, such as, for example adjacent to an energized power line.

Broadly, aspects of the present disclosure are directed to a remotely controllable robot unit comprising an image and sensory capturing system and at least one utility arm for performing actions. As described herein, the robot unit may be controlled remotely by an operator to perform actions, such as powerline repair work. Through such remote control, the operator is removed from any potentially dangerous situations. To provide the operator with visual, sensory, and other information, the robot unit may further comprise a sensory capturing system comprising at least a camera and a three-dimensional depth camera. Video information may be provided to the operator through a virtual reality ("VR") headset and the operator may issue commands through joysticks or other controllers to instruct the robot unit to perform an action. To aid the operator and/or the robot unit in performing actions efficiently and correctly, three-dimensional depth information may be captured by the three-dimensional depth camera for generating a three-dimensional representation of the field of view at a computer. Accordingly, the computer can receive instructions, compare the instructions to the three-dimensional representation, and cause the robot unit to perform an action based on the instructions and the three-dimensional representation. To further aid in providing a realistic and immersive experience to the operator, the robot unit may comprise a six degree-of-freedom ("DOF") camera mount for mimicking or replicating the movement of the operator. Accordingly, in addition to movement in the x, y, and z plane, the robot unit can further control pitch, yaw, and roll of the camera mount, However, it will be appreciated that particular embodiments and applications of the present teachings may vary, including any of the examples provided herein. For example, the present disclosure may be utilized in a variety of applications, including but not limited to military applications, construction applications, rescue applications, health and safety applications or other applications that robotics may be utilized. Accordingly, it will be appreciated that specific embodiments or details provided herein are intended to be illustrative, rather than limiting.

Figure 2:
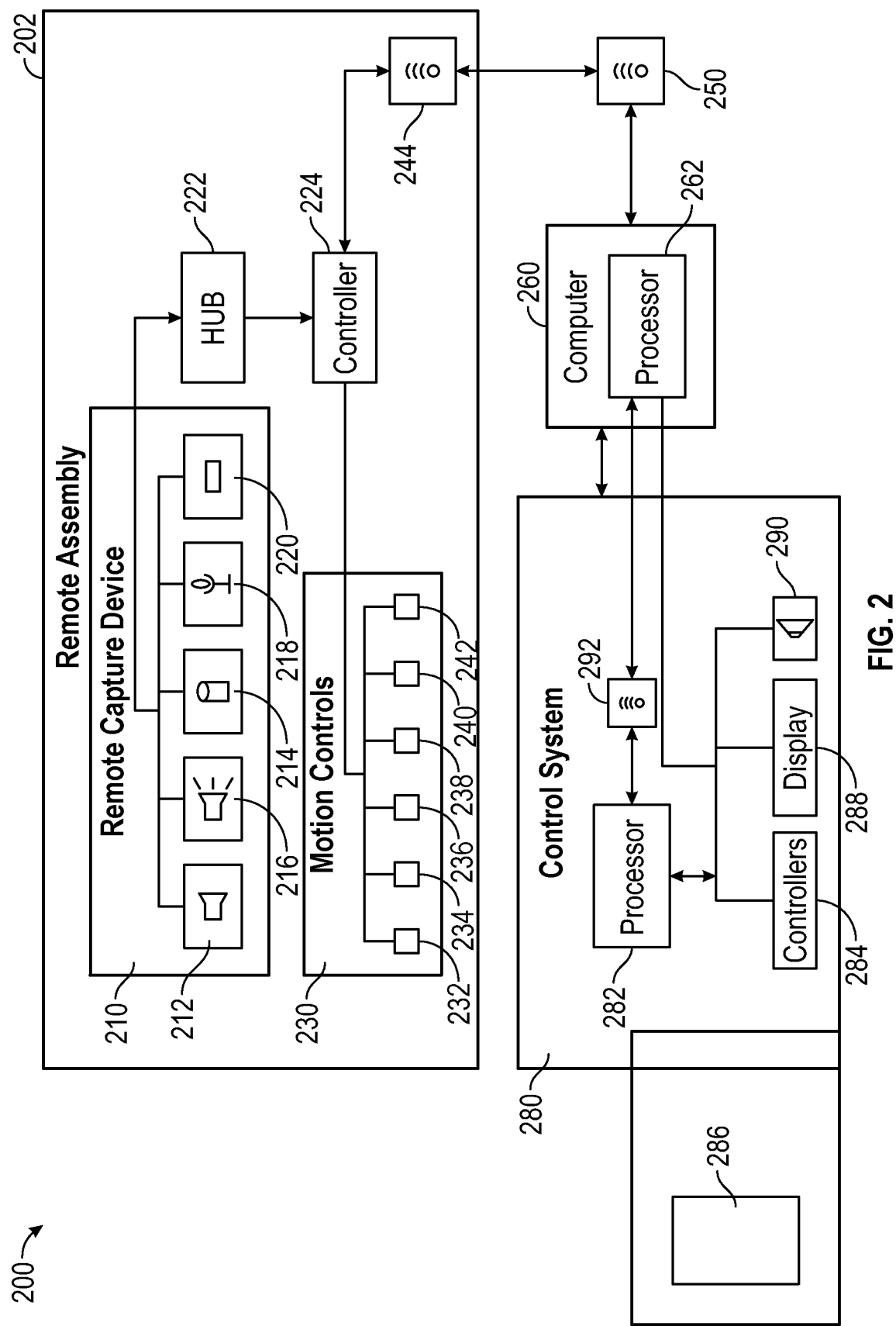
FIG. 2 depicts an exemplary system architecture of a robot unit and manual controls relating to some embodiments.

FIG. 2 depicts an exemplary block diagram 200 related to some embodiments. In some embodiments, the remote assembly system 300 comprises various assemblies, sub-assemblies, parts, or components for capturing sensory information and/or for performing actions, such as repair work in a telecommunication setting. The remote assembly system 300 may comprise various circuitry, parts, or other components for capturing sensory information, including video, three-dimensional depth information, audio, and other sensory data. Further, the remote assembly system 300 may comprise a manually controlled or autonomous robot unit that may be positioned at the end of the boom assembly 114 for interacting with a work site to perform one or more task. For example, as described above, in many real-life scenarios, tasks to be performed may not be discovered until reaching the job site, and accordingly, the robot unit may comprise a variety of tools, features, or functions to respond to a variety of different tasks. Additionally, as described in greater detail below, remote robot assembly may further comprise one or more parts, components, or features for providing an operator with sensory information, providing the operator with additional information about the job site to improve efficiency, efficacy, and/or safety of both the remote assembly system 300 and the operator.

As depicted in the block diagram 200, a remote robot assembly 202 comprises at least a remote capture device 210, a computer 260, and a control system 280. In some embodiments, and as described in greater detail herein, the remote capture device 210 may be a device configured and adapted for the capturing of sensory information and may be positioned on a robot unit for the capturing of sensory information that may be utilized by computer 260, to present information to an operator via control system, among other purposes. FIG. 2 depicts exemplary sensors, cameras, and other apparatuses that may be utilized by remote capture device 210 for the capturing of sensory information. As described in greater detail below, remote capture device 210 may be mounted or positioned on a selectively movable mount or portion of a robot unit. For example, the robot unit may be a robot unit positioned at the end of a boom assembly for aerial application. However, remote capture device 210 may also be used with a robot unit that is not attached on a boom assembly, and for example, may be utilized with a robot unit for ground application or attached to a mechanical arm or an aerial drone. Accordingly, via the robot unit, sensory information may be captured by remote capture device 210.

Through selective inputs, including both manually inputted instructions and/or automated instructions, remote capture device 210 may capture video, still images, three-dimensional depth information, audio, electrical conductivity, voltage, among other information that may be captured by a sensor or recording device. For example, remote capture device 210 may comprise at least one camera 212 for the capturing of video or still images (collectively, "video"). The at least one camera 212 may be a camera positioned on remote capture device 210 for the capturing of video within a selected field of view. The resolution of the video captured by camera 212 may vary, but in some embodiments, camera 212 may be a camera configured for capturing in at least 720p resolution but may capture in higher resolution including but not limited to 1080p, 2K, 4K, or 8K resolution. However, it will be appreciated that the camera 212 may be any currently known or yet to be discovered camera for capturing video. Video captured from camera 212 may be stored locally at remote capture device at a local memory 214. The storing of video at local memory 214 may aid in providing a failsafe or backup storage of captured video in the event of a transmission or upload failure. Further, the storing of video at local memory 214 may aid in situations of poor wireless connection or if a direct line becomes loos or interrupted, preventing the immediate transmission of captured video. Optionally or additionally, video captured from camera 212 may be transmitted to computer 260 for processing, analyzing, storage, and/or for later transmitting to control system 280. In further embodiments, video captured from camera 212 may be directly transmitted to control system 280 for processing.

In some embodiments, remote capture device 210 may further comprise at least one three-dimensional camera 216 or other device configured for capturing three-dimensional depth information. As described in greater detail below, the three-dimensional depth camera 216 may be utilized for capturing three-dimensional depth information within a field of view for creating a point cloud, 3-D model, or other digital representation of an object or area scanned or viewed by the three-dimensional camera 216. Three-dimensional camera 216 may be operated in conjunction with, or independent from camera 212 or other components or parts of remote assembly 202 and/or remote capture device 210. As described in greater detail below, in response to instructions or an input, three-dimensional camera 216 may begin capturing three-dimensional depth information about an object or area within a field of view. Like the captured video with respect to camera 212, the three-dimensional depth information captured by three-dimensional camera 216 may be saved locally at memory 214. In some embodiments, remote capture device 210 may comprise a separate memory 214 for video captured by camera 212 and a separate memory 214 for three-dimensional information captured by three-dimensional camera 216. As described in greater detail below, remote capture device 210 may comprise a microphone 218 and/or at least one sensor 220 for capturing additional sensory information. Accordingly, in some embodiments, a separate and distinct memory 214 may be used for each sensory capture device (i.e., camera 212, three-dimensional camera 216, microphone 218, and/or sensor 220). In further embodiments, remote capture device 210 may comprise a single memory 214 for the storing of all captured sensory information. As described above and in further embodiments, three-dimensional information may be directly sent to computer 260 in addition to or instead of storing locally at memory 214.

In addition to capturing video and/or three-dimensional information, it may also be advantageous for remote capture device 210 to capture additional sensory information that may be presented to an operator or processed by computer 260. For example, in certain scenarios it may be advantageous for remote capture device 210 to capture audio via at least one microphone 218. Continuing with the running example, a remote assembly 202 for use with telecommunications repair may utilize audio information for diagnostic or safety purposes. For example, audio information may capture the sounds of the job site and the audio information may be processed to determine if a job site is safe. Accordingly, in some embodiments, remote capture device 210 may comprise at least one microphone 218 for the capturing of audio information. Similar to the video and three-dimensional information as described above, captured audio information may be stored locally at a memory 214 and/or transmitted to a computer 260 and/or control system 280.

Similar to audio information, remote capture device 210 may further comprise one or more sensors 220 for the capturing of additional sensory information, metrics, or data. For example, continuing with the running example, the remote capture device 210 may be used with a remote assembly 202 positioned at the end of boom assembly 114 for telecommunication or powerline work. In such a work application, the remote assembly 202 may be working on or near live powerline or other conductive lines transferring electricity. Accordingly, in some embodiments, remote capture device 210 may comprise at least one sensor 220 configured as an electricity sensor for determining whether a cable or powerline has electricity running through it. However, it will be appreciated that remote capture device 210 may comprise additional sensors 220 configured and adapted for providing remote capture device and/or remote assembly 202 with additional information. By way of non-limiting example, sensor 220 may comprise any of the following sensors: a gyroscope, an accelerometer, a thermometer, a barometer, a light emitter, a voltage meter, a current meter, among other sensors that may be utilized in the intended application of remote assembly 202.

In some embodiments, the remote assembly 202 may further comprise at least one digital Hub 220. In some embodiments, the remote assembly 202 further comprises at least one digital Hub 222. The digital Hub 22 may receive the captured sensory information from remote capture device and convert the captured sensory information into a format suitable for transmitting to computer 260 and/or control system 280. In some embodiments, the digital Hub 222 is a USB Hub, such as, for example, a USB 3.0.

As further depicted in FIG. 2, remote assembly 202 may further comprise a controller 224. In some embodiments, controller 224 may be a processor or other circuitry or computer hardware for receiving commands or instructions from control system 280 and/or computer 260 and for relaying or providing commands to remote capture device 210 and/or motion controls 230. Accordingly, in some embodiments, instructions or commands from controller 224 may be sent to remote capture device 210. For example, instructions sent from controller 224 to remote capture device 210 may include instructions to begin recording video via camera 212. However, it will be appreciated that instructions sent from controller 224 may cause any of the components of remote capture device 210 to begin capturing sensory information, including but not limited to three-dimensional information, audio information, or other sensory information captured by any of the sensors 220 of remote capture device 210. Additionally, controller 224 may be used to send instructions to cause remote assembly 202, remote capture device 210, and/or motion controls 230 to perform other actions corresponding to the instructions. For example, instructions from controller 224 may instruct remote capture device 210 to store captured sensory information on local memory 214. Additionally, instructions from controller 224 may be sent to motion controls 230 to instruct remote assembly 202 to perform a movement. Further, controller 224 may be in communication with transceiver 244 for communicating with computer 260 and/or control system 280 to send sensory information or other data or information to computer 260 and/or control system 280. Similarly, controller 224 may further be configured for receiving instructions, commands, or other information from computer 260 and/or control system 280.

As further depicted in the block diagram of FIG. 2 and in some embodiments, remote assembly 202 may further comprise motion controls 230. Motion controls 230 may be configured and adapted for controlling the movement of remote assembly 202, including any utility arms or camera mounts as described in greater detail below. In some embodiments, remote assembly 202 may be comprise a 6 DOF robot unit configured with utility arms and/or camera mounts that can move with 6 DOF. Accordingly, motion controls 230 may be configured to provide instructions or commands to remote assembly 202 to move in 6 DOF. In some embodiments, motion controls may comprise x-axis control 232, y-axis control 234, z-axis control 236, pitch control 238, yaw control 240, and/or roll control 242 for moving remote assembly 202 with 6 DOF. It will be appreciated however, that remote assembly 202 may comprise varying designs, and in some embodiments, may move in fewer than 6 DOF. Accordingly, in further embodiments, motion controls 230 may comprise controls configured and adapted for moving remote assembly 202 in an appropriate number of planes.

As described above, motion controls 230 may be in communication with controller 224. Instructions or commands from controller 224 may be sent to motion controls 230. Upon receipt of the instructions, the corresponding controls 232, 234, 236, 238, 240, and/or 242 may be instructed to cause movement of the remote assembly 202 based on the received instructions. As described above, one or more arms or limbs of remote assembly 202 may be configured to move with 6 DOF. Based on the instructions, the corresponding motion controls 230 may cause movement of the remote assembly 202 to correspond to the instructions.

As described above, remote assembly 202 may be communicatively coupled to computer 260. In some embodiments, computer 260 may be directly coupled to remote assembly 202, such that computer 260 and remote assembly 202 are a combined system. For example, computer 260 may be directly installed into a frame or body of remote assembly 202. Accordingly, remote assembly 202 and computer 260 may be in direct communication through cables or other direct methods. In further embodiments, computer 260 may be located external to remote assembly 202. When located externally, remote assembly 202 and computer 260 may nevertheless be communicatively coupled. For example, in some embodiments, remote assembly 202 and computer 260 may be coupled through a physical connection such as an Ethernet cable or USB cable. In further embodiments, remote assembly 202 and computer 260 may be coupled through a wireless connection, such as WiFi, Bluetooth®, cellular connection, or another wireless connection. In embodiments in which computer 260 and remote assembly 202 are connected through a wireless connection, transceiver 244 may communicate with another transceiver 250 coupled or otherwise in communication with computer 260.

In some embodiments, computer 260 may receive and process sensory information captured by remote capture device 210 of remote assembly 202. Accordingly, computer 260 may comprise at least a processor 262 for executing commands, which may include instructions for processing, analyzing, or utilizing captured sensory information. For example, as described in greater detail below, computer 260 may utilize captured three-dimensional information to generate a point-cloud, three-dimensional model, or other digital representation of an object or area captured by remote capture device 210.

In some embodiments, control system 280 may be an interface, apparatus, or system providing a user with an interactive medium for interacting with computer 260 and/or remote assembly 202. For example, in some embodiments, control system 280 may comprise at least a processor 282, at least one controller 284, at least one display 288, at least one sensor 290, and at least one transceiver 292. As described in greater detail below, some embodiments of the present teachings provide for a method of controlling remote assembly 202 from a remote location. Continuing with the running example, oftentimes telecommunications repair or powerline repair sometimes occur during or immediately after a severe weather storm. This type of scenario can be wrought with dangers such as exposed and live powerlines, high winds, lightning, and other dangers that pose a risk to human workers. Accordingly, it may be advantageous for an operator of remote assembly 202 to control remote assembly 202 in a safe location, such as in a work truck or building away from the job site. Accordingly, control system 280 may comprise at least one interfacing controller 284, providing an interactive means for a user to input commands or instructions for controlling or manipulating remote assembly 202. Controller 284 may be any interface for inputting commands or instructions that can be transmitted and processed by a computer or other hardware. By way of non-limiting example, controller 284 may comprise hand-held motion control controllers. As described in greater detail below, the motion control controllers may be beneficial for an operator to perform specific movements or actions that can be captured and relayed to remote assembly 202 to perform. Through the use of motion-control controllers, an operator may be provided with a sensory effect similar to being at the job site and performing the actions themselves. However, controller 284 is not limited to motion controls and instead, controller 284 may be any interface for an operator to input instructions or commands for remote assembly 202. For example, in further embodiments, controller 284 may be a handheld controller, similar to that of a video game controller comprising thumbsticks, buttons, triggers, and/or other interfacing inputs. In further embodiments, controller 284 may comprise a joystick and button design. In even further embodiments, controller 284 may be a mouse and keyboard. In even further embodiments, controller 284 may be configured as a glove or interactive model of a hand, allowing an operator to perform native hand manipulations which may be captured and transmitted to remote assembly 202. In even further embodiments, controller 284 may comprise a camera component or other motion capture component for capturing the movement of an operator. For example, in addition to, or in place of a physical controller handled by the operator, a camera component may capture the movement of the operator. The captured movement may be transmitted to computer 260 for translation or mapping movement of remote assembly 202. Optionally, or additionally, motion capture aids, such as motion capture dots, may also be used for capturing movement of the operator. In some embodiments, may It will be appreciated that the examples provided herein are intended to be illustrative, rather than limiting, and that controller 284 may be any apparatus or method of receiving instructions or an input from an operator.

In some embodiments, control system 280 may further comprise a power medium 286 for powering one or more parts or components of control system, including for example controller 284, display 288, or the at least one sensor 290, or any combination thereof. In some embodiments, a single power medium may power all parts or components of control system 280. In further embodiments, individual parts or components of control system 280 may comprise a separate and distinct power medium 286. For example, a first power medium 286 may be used for powering controller 284 and a second power medium 286 may be used for powering display 288. Power medium 286 may be any conventionally known power source for providing power to an electrical device, including but not limited to an internal power source such as a battery, or an external battery source such as an electrical outlet.

As further depicted in FIG. 2, control system 280 may further comprise at least one display 288. In some embodiments, display 288 may be a monitor, touchscreen, television screen, or other display. In some embodiments, at least a portion of the captured sensory information from remote capture device 210 may be displayed on display 288 for an operator to view. For example, captured video may be displayed on display 288. Providing sensory information on display 288 may provide an operator with a more immersive feel when remotely operating remote assembly 202. Through a real-time video feed, an operator may experience the job site as if the operator was physically present, even if the operator is in a safe location miles away. Additionally, providing sensory information to an operator via display 288 may aid the operator in inputting instructions or commands via controller 284.

In some embodiments, control system 280 may further comprise at least one sensor 290, which may provide additional sensory affect to the operator and/or capture additional inputs that may be used by computer 260 to provide instructions to remote assembly system 300. In some embodiments, one or more sensors may be combined with controller 284 and/or one or more sensors may be combined with display 288. For example, in some embodiments, sensor 290 may be at least one speaker or sound emitting device to provide the operator with audio information captured from remote capture device 210 or pre-recorded or pre-rendered audio. In further embodiments, the at least one sensor 290 may be one of an accelerometer, a gyroscope, a light sensor, or any other type of sensor 290 suitable to detect the viewing angle of the user or the movement, position, or angle of the operator's body.

In some embodiments, and as described in greater detail below, an operator may utilize controller 284, display 288, and the at least one sensor 290 to provide instructions to remote assembly 202, which may be analyzed and translated into instructions to cause remote assembly 202 to move or perform an action. As also described in greater detail below, an operator may input instructions or commands through control system 280. In some embodiments, inputs may be inputted or captured by a combination of controller 284 and display 288. For example, display 288 may be coupled to a head-mounted unit as described in greater detail below. An operator may move their head or torso with sensor 290 capturing the movement and/or viewing angle of the operator. The captured movement data or viewing angle may be sent to computer 260 via transceiver 292, and computer 260 may take the captured movement data or viewing angle and translate into instructions for causing remote assembly 202 to move and mimic or replicate the operator's movement and match the viewing angle of the operator.

Figure 3:
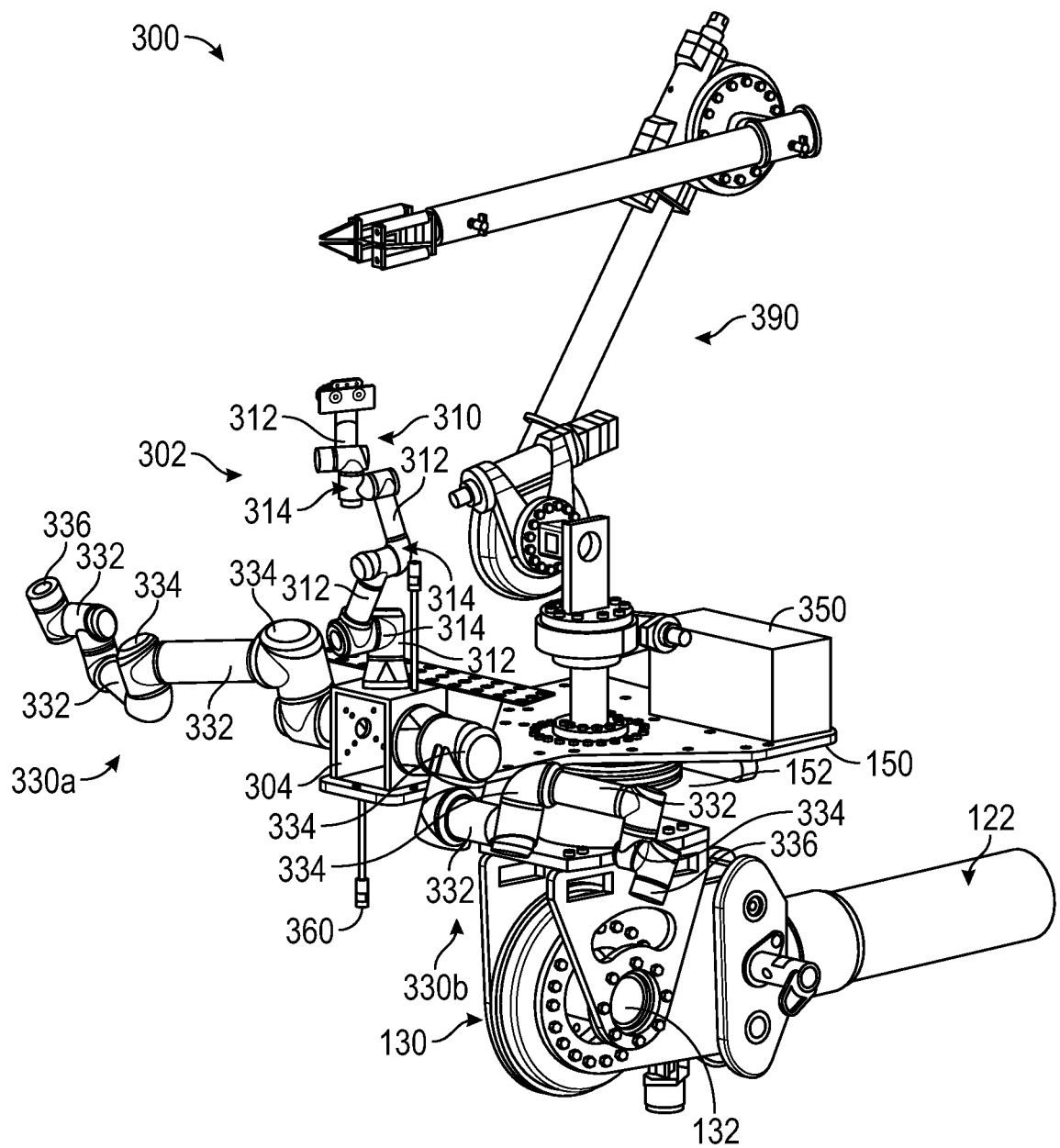
FIG. 3 depicts a six-degree-of-freedom robot unit relating to some embodiments.

FIG. 3 is an exemplary embodiment of a remote assembly system 300. In some embodiments, the remote assembly system 300 may comprise various assemblies, sub-assemblies, parts, or components, including but not limited to a robot unit 302 affixed at the end of a boom assembly 114. Further, the remote assembly system 300 may correspond to the remote assembly 202 as described above with respect to FIG. 2 and may comprise any and all of the components or parts as described above. In some embodiments, robot unit 302 may be configured and adapted to receive instructions from a computer or operator to perform a corresponding movement or action. In some embodiments, robot unit 302 may be a fully manually controlled robot, wherein the robot unit 302 will not perform a movement or action absent an instruction provided from an operator. In further embodiments, robot unit 302 may be fully a fully automated robot, wherein the robot unit 302 performs actions or movements based on pre-programmed instructions for automation. In even further embodiments, robot unit 302 may be a robot configured to respond to both manually inputted instructions and automated programming. Accordingly, the various movements or actions performed by robot unit 302 and described herein may be performed based on manually provided instructions and/or automated programming.

As described above and as illustrated in FIG. 3, in some embodiments, remote assembly system 300 may be positioned at the distal end 122 of boom assembly 114. As depicted, in some embodiments, distal end 122 of boom assembly 114 may comprise a pivot joint 130 comprising a motor 132. In some embodiments, pivot joint 130 may be used to change an angle or position of remote assembly system 300. In further embodiments, pivot joint 130 may be paired with a sensor, such as a gyroscope, to aid in maintaining a leveled position of remote assembly system 300. As further depicted in FIG. 3, pivot joint 130 may further act as an attachment point between remote assembly system 300 and boom assembly 114. For example, a base 150 may be coupled to pivot joint 130. Base 150 may be adapted and configured for receiving and coupling remote assembly system 300. Accordingly, through such coupling, remote assembly system 300 may be secured and attached to boom assembly 114. In some embodiments, base 150 may comprise a generally planar design for accepting and securing one or more assemblies, sub-assemblies, parts, or components of remote assembly system 300. Further, the size and shape of base 150 may vary, and may be dependent on design of remote assembly system 300. Further, in some embodiments, base 150 may further comprise a motorized turntable 152. Motorized turntable 152 may be a power motor train system for rotating base 150. The rotation of base 150 may be advantageous for positioning remote assembly system 300 during use.

In some embodiments, remote assembly system 300 may generally comprise a robot unit 302. Robot unit 302 may be a controllable robotics unit that can perform a range of movements and actions, such as performing repair work in a telecommunication setting. In some embodiments, and as described in greater detail below, robot unit 302 may be 6 DOF robotics assembly, configured and adapted for mimicking the movement of an operator utilizing a VR controller. Particularly, through a 6-DOF configuration, robot unit 302 may substantially mimic the torso, neck, and arm movements of the operator. Through such movement, robot unit 302 may perform a greater range of movements and/or provide a more immersive experience to an operator than pre-existing systems.

In some embodiments, robot unit 302 may comprise a central hub 304. Central hub 304 may be a central housing or base, which may house a processor, a power source, circuitry, a wireless communication means among other electronics for robot unit 302, including the components described above with respect to FIG. 2. Additionally, central hub 304 may act as a coupling or attachment member, securing robot unit 302 to base 150. Even further, central hub 304 may also act as a receiving point for one or more parts or components of robot unit 302. For example, and as described below, robot unit 302 may comprise at least one utility arm and at least one camera mount. Accordingly, central hub 304 may receive and couple with the at least one utility arm and the at least one camera arm.

To collect sensory information, including but not limited to video and three-dimensional depth information, robot unit 302 may comprise at least one camera mount 310. Camera mount 310 may be a 6 DOF, selectively controllable robotic arm, that may couple to central hub 304. As described in greater detail below, robot unit 302 may receive movement instructions or commands from computer 260 that may cause camera mount 310 to move or change position. For example, camera mount 310 may correspond to a head mount or other capture apparatus to capture the viewing angle of an operator. Instructions or commands may be relayed to robot unit 302 causing camera mount 310 to move in a corresponding manner to match the viewing angle of the operator. To enhance the operator experience, camera mount 310 may comprise a plurality of camera mount segments 312 that may be separate by motorized pivotable joints 314. The number and size of camera mount segments and pivotable joints 314 may vary depending on the embodiments and application of robot unit. Generally, in response to an instruction or commands, one or more of the pivotable joints 314 may activate to rotate or move camera mount 310. In some embodiments, the pivotable joints 314 may be used to move camera mount 310 in the X-axis, Y-axis, Z-axis as well as control the roll, pitch, and yaw of the camera mount 310. Accordingly, through movement in the 6 DOF, camera mount 310 may mimic or replicate the viewing angle of the operator. As further depicted in FIG. 3, a distal end of camera mount 310 may further comprise a sensory capture device. In some embodiments, the sensory capture device generally comprises at least one camera, three-dimensional camera, and/or sensor for capturing sensory information.

As described above, robot unit 302 may be adapted for performing repair work, maintenance work, or other similarly situation tasks or actions. To perform these actions, robot unit 302 may comprise at least one utility arm. The depicted embodiment as illustrated in FIG. 3 illustrates an exemplary embodiment of robot unit 302 comprising two utility arms 330a, 330b. Like camera mount 310 as described above, each of utility arms 330a, 330b may comprise a plurality of utility arm segments 332 that may be separate by motorized pivotable joints 334. The number and size of utility mount segments 332 and pivotable joints 334 may vary on the embodiments and application of robot unit. Generally, in response to an instruction or commands, one or more of the pivotable joints 334 may activate to rotate or move utility arms 330a, 330b. In some embodiments, the pivotable joints 334 may be used to move utility arms 330*a*, 330*b* in the X-axis, Y-axis, Z-axis as well as control the roll, pitch, and yaw of the camera mount 310. Accordingly, through movement in the 6 DOF, each utility arm 330*a*, 330*b* may mimic or replicate the movement of an operator's arms and hands. In some embodiments, the distal ends 336 of utility arms 330*a*, 330*b* may comprise one or more tools, flanges, or other apparatus for performing an action such as repair work. In some embodiments, distal ends 336 may comprise an adapter or may be otherwise configured for accepting a tool.

Remote assembly system 300 may further comprise a remote power source 350. In some embodiments, the remote power source 350 may be secured to the base 150. In further embodiments, remote power source 350 may be located within central hub 304. The remote power source 350 may be used to power camera mount 310, utility arm 330*a*, utility arm 330*b*, or any combination thereof. Remote power source 350 may be an electric generator, batteries, or any other known power source.

In further embodiments, robot unit 302 may comprise one or more additional capture devices or sensors 360 for capturing additional information that may be analyzed and/or presented to a user or operator in addition to the sensors or capture devices of sensory capture device. For example, in some embodiments, robot unit 302 may comprise a thermometer or heat sensor for capturing heat information. In some embodiments, robot unit 302 may comprise an electrical sensor for capturing electrical data. For example, robot unit 302 may be used to work on power lines or in other scenarios involving live power lines or other electrically charged wires or circuitry. accordingly, to avoid damage to the robot unit 302, the boom assembly 114, or the utility vehicle 112, at least one sensor 360 may be a sensor for detecting an electrical current. Additionally, robot unit 302 may comprise at least one sensor 360 that is at least one of an accelerometer, gyroscope, light sensor, or other sensor for detecting the positioning of camera mount 310, utility arm 330*a*, and/or utility arm 330*b*. In some embodiments, a sensor for detecting the positioning of robot unit 302 may aid in replicating or mimicking movement of an operator using motion controls.

In some embodiments, and as depicted in FIG. 3, in addition to robot unit 302, boom assembly and remote assembly system 300 may further comprise at least one heavy utility arm 390 or additional robotics assembly that may operate separately or in conjunction with robot unit 302. For example, in many robotics applications, a delicate balance is often considered when designing the features and capabilities of a robot. Typically, robotics adapted and configured for delicate work and fine adjustments are typically not capable of transporting or holding heavy loads. Conversely, robotics adapted and configured for holding or transporting heavy loads typically lack the structural components to perform delicate or fine-tuned actions. By way of non-limiting example, in telecommunication repairs, heavy parts may need to be lifted from the ground to a telecommunication pole. Lifting a heavy part may require a robotics configured for transporting heavy loads. However, once in position, the part may need a robotics configured for delicate or sophisticated operations to install the part in position. Embodiments of the present disclosure solve this dilemma by pairing a robotic assembly configured and adapted for fine tuning and/or delicate work with a robotics configured and adapted for load bearing or transporting heavy loads. For example, in some embodiments, robot unit 302 may be configured and adapted for performing movements or actions directed to sophisticated, delicate, or fine-tuning work, such as unthreading wire, cutting wire, loosening screws and bolts. In some embodiments, remote assembly system 300 may comprise a at least one utility arm 390 for holding or transporting heavy loads that may be too heavy for robot unit 302 to safely hold and transport. Accordingly, through the combination of robot unit 302 and utility arm 390, remote assembly system 300 may perform both dexterous actions and load-bearing actions.

Turning now to FIG. 4, a wire tensioning system 400 relating to some embodiments is depicted. Wire tensioning system 400 is adapted to be manipulated by one or more robotic appendages. These robotic appendages may be attached to an aerial device, fixed to a vehicle, incorporated in a self-operating robot, incorporated in a flying device (e.g., a flying drone, quadcopter, or remote-control helicopter), or the like. In some embodiments, the robotic appendages are attached to a dielectric material (e.g., fiberglass, plastic, or rubber) which is in turn attached to an aerial device, fixed to a vehicle, incorporated in a self-operating robot, incorporated in a flying device, or the like. In some embodiments, the wire tensioning system 400 includes a mount 402, a tensioner 414, a connecting line 416, a clamp 418, a rigid supporting structure 408, slidable sleeves 404 and 412, and suspension mediums 406 and 410. In some embodiments, any number of components of the wire tensioning system 400 may be adapted to be manipulated by one or more robotic appendages.

In some embodiments, supporting structure 408 is adapted to be hanged from an electrical cable or conductor by suspension mediums 406. In other embodiments, supporting structure 408 is adapted to extend from mount 402 without suspension from an electrical cable or conductor. In some embodiments, supporting structure 408 is sized to interface with robotic appendage 620. In some such embodiments, supporting structure 408 is adapted to interface with grabbing tool 624. Rigid supporting structure 408 may comprise a metal rod, metal beam, metal rail, and the like. In some embodiments, rigid supporting structure 408 may comprise a dielectric member wherein mount 402 and clamp 418 are electrically isolated from each other. In some such embodiments, the dielectric member may comprise a dielectric material such as composite fiberglass, silicone, glass, rubber, plastics, and the like. Suspension mediums 406 and 410 may comprise hooks, clamps, carabiners, clips, or the like. In some embodiments, suspension mediums 406 and 410, and supporting structure 408 may be coated in an insulating material to insulate them from the electrical cable or conductor. In some embodiments, suspension mediums 406 and 410 may comprise a single cross-arm mounting bracket centrally located along the length of supporting structure 408. In some such embodiments, the single cross-arm mounting bracket is included in place of suspension mediums 406 and 410 and is adapted to mount the wire tensioning system 400 to a utility pole cross arm. Additionally, embodiments are contemplated in which an insulating cover may be placed over the suspension mediums 406 and supporting structure 408 to provide electrical insulation. Such an insulating cover may include insulator materials such as rubber, fiberglass, or the like.

In some embodiments, mount 402 is adapted to attach to a rigid object such as a tree, utility pole, utility pole cross-arm, or the like. Mount 402 may be coupled to tensioner 414 and/or coupled to supporting structure 408. The mount 402 may comprise a clamp, a woven cable net, a screw mount, or the like. In some embodiments, mount 402 is adapted to interface with robotic appendage 620.

Mount 402 may comprise handles sized to be interface with grabbing tool 624. In some embodiments, mount 402 may be coated in an insulated material such that the mount 402 is electrically insulated from the electrical cable attached by clamp 418. Additionally, or in the alternative, in some embodiments, an electrically insulated cover may be placed over the mount 402.

In some embodiments, clamp 418 is sized to allow robotic appendage 620 to interface with clamp 418. For example, clamp 418 may have one or more handles sized to interface with grabbing tool 624. In some embodiments, clamp 418 is disposed at a first end of supporting structure 408 and tensioner 414 is disposed at a second end of the supporting structure 408. Here, each of tensioner 414 and clamp 418 may be coupled to supporting structure 408 by slidable sleeves 404 and 412 respectively. Slidable sleeves 404 and 412 may comprise sliding bushings, rollers, glides, or other translatable connectors. In some such embodiments, slidable sleeve 404 may be fixed to supporting structure 408 such that tensioner 414 cannot freely move along the length of supporting structure 408 while slidable sleeve may continue to slide along the length of supporting structure 408. Further, embodiments are contemplated in which the slidable sleeves 404 may be selectably tightened onto the supporting structure 408 such that slidable sleeves 404 may be selectably repositioned before or during operation. In some embodiments, clamp 418 may comprise a wire puller, a cable clamp, a vice, a jaw grip, a cable pulling weave, or the like. In some embodiments, clamp 418 may be disposed alongside supporting structure 408, and in other embodiments, clamp 418 may be disposed above supporting structure 408.

In some embodiments, connecting line 416 is disposed below the supporting structure 408 and, in other embodiments, connecting line 416 may be disposed beside or above the supporting structure 408. Connecting line 416 may comprise a ratchet strap, a rope, a steel cable, a metal rod, a threaded rod, a linear gear, and the like. In some embodiments, the connecting line 416 may comprise one or more lengths of dielectric material such that a first and second end of connecting line 416, and any object connected thereto, are electrically isolated from each other. In some such embodiments, said length of connecting line 416 may comprise a dielectric member such as a dielectric rope, a flexible fiberglass strap, a composite fiberglass rod, a nylon rope, a plastic rod, and the like. Connecting line 416 connects mount 402 and clamp 418 via tensioner 414. Accordingly, in some embodiments, during operation, the connecting line 416 is drawn towards mount 402 by tensioner 414 to adjust and maintain the tension of an electrical cable gripped by clamp 418.

In some embodiments, tensioner 414 is adapted to interface with robotic appendage 620. In some such embodiments, tensioner 414 is adapted to interface with grabbing tool 624 such that grabbing tool 624 actuates the tensioner. For example, tensioner 414 may have one or more handles sized to be interfaced by grabbing tool 624. In other embodiments, tensioner 414 is adapted to interface with robotic appendage 622. In some such embodiments, tensioner 414 is adapted to interface with drilling tool 626 such that drilling tool 626 actuates tensioner 414 to adjust the tension of the connecting line. In some embodiments, tensioner 414 is disposed below supporting structure 408 by slidable sleeve 404 such that tensioner 414 may move along the length of the supporting structure 408. Tensioner 414 may comprise a gearbox adapted to interface with a linear gear, a threaded rod, a toothed rod, and the like. In other embodiments, tensioner 414 is a ratchet adapted to interface with a ratchet strap. In some such embodiments, where tensioner 414 is a ratchet, the connecting line 416 may comprise a ratchet strap.

Turning now to FIG. 5, a wire tensioning system 500 relating to some embodiments is depicted. Wire tensioning system 500 is adapted to be manipulated by one or more robotic appendages. These robotic appendages may be attached to an aerial device, fixed to a vehicle, incorporated in a self-operating robot, incorporated in a flying device (e.g., a flying drone, quadcopter, or remote-control helicopter), or the like. In some embodiments, the robotic appendages are attached to a dielectric material (e.g., fiberglass, plastic, or rubber) which is in turn attached to an aerial device, fixed to a vehicle, incorporated in a self-operating robot, incorporated in a flying device, or the like. In some embodiments, wire tensioning system 500 comprises a tensioner 414, a connecting line 416, a supporting structure 408, slidable sleeves 404 and 412, suspension mediums 406, a first clamp 520, and a second clamp 522. FIG. 5 describes many elements similar to FIG. 4, the common elements thereof will not be further described in detail.

In some embodiments, clamps 520 and 522 may be disposed below supporting structure 408. In other embodiments, clamps 520 and 522 may be disposed above or alongside supporting structure 408. Clamps 520 and 522 may be coupled to supporting structure 408 by slidable sleeves 404 and 412. In some embodiments, slidable sleeves 404 and 412 may comprise sliding bushings, rollers, glides, or other translatable connectors. Clamps 520 and 522 may comprise a wire puller, a cable clamp, a vice, a jaw grip, a cable pulling weave, or the like. Clamps 520 and 522 are coupled to tensioner 414 via connecting line 416.

In some embodiments, connecting line 416 is split into two sections extending from a first and second side of the tensioner to clamps 520 and 522. Connecting line 416 may comprise a ratchet strap, a rope, a steel cable, a metal rod, a threaded rod, a linear gear, and the like. In some embodiments, any length of connecting line 416 may comprise one or more lengths of dielectric material such that a first and second end of connecting line 416, and any object connected thereto, are electrically isolated from each other. In some such embodiments, said length of connecting line 416 may comprise a dielectric member such as a dielectric rope, a flexible fiberglass strap, a composite fiberglass rod, a nylon rope, a plastic rod, and the like. In some embodiments, where tensioner 414 comprises a ratchet, connecting line 416 may comprise a ratchet strap.

In some embodiments, tensioner 414 may be disposed between clamps 520 and 522. Tensioner 414 may comprise a gearbox adapted to interface with a linear gear, a threaded rod, a toothed rod, and the like. In other embodiments, tensioner 414 is a ratchet adapted to interface with a ratchet strap. In some such embodiments, where tensioner 414 is adapted to interface with a threaded rod, connecting line 416 may be separated into two connecting lines. Additionally, embodiments are contemplated in which tensioner 414 may be adapted to interface with two threaded rods such that the tensioner 414 actuates the threaded rods to move in opposing directions, thereby drawing clamps 520 and 522 towards each other and tensioning the electrical cable that clamps 520 and 522 attach to.

In some embodiments, supporting structure 408 is adapted to be hanged from an electrical cable or conductor by suspension mediums 406. In some such embodiments, as similarly described above, supporting structure 408 is adapted to extend between clamps 520 and 522. Supporting structure 408 may comprise a metal rod, metal beam, metal rail, and the like.

Figure 6A:
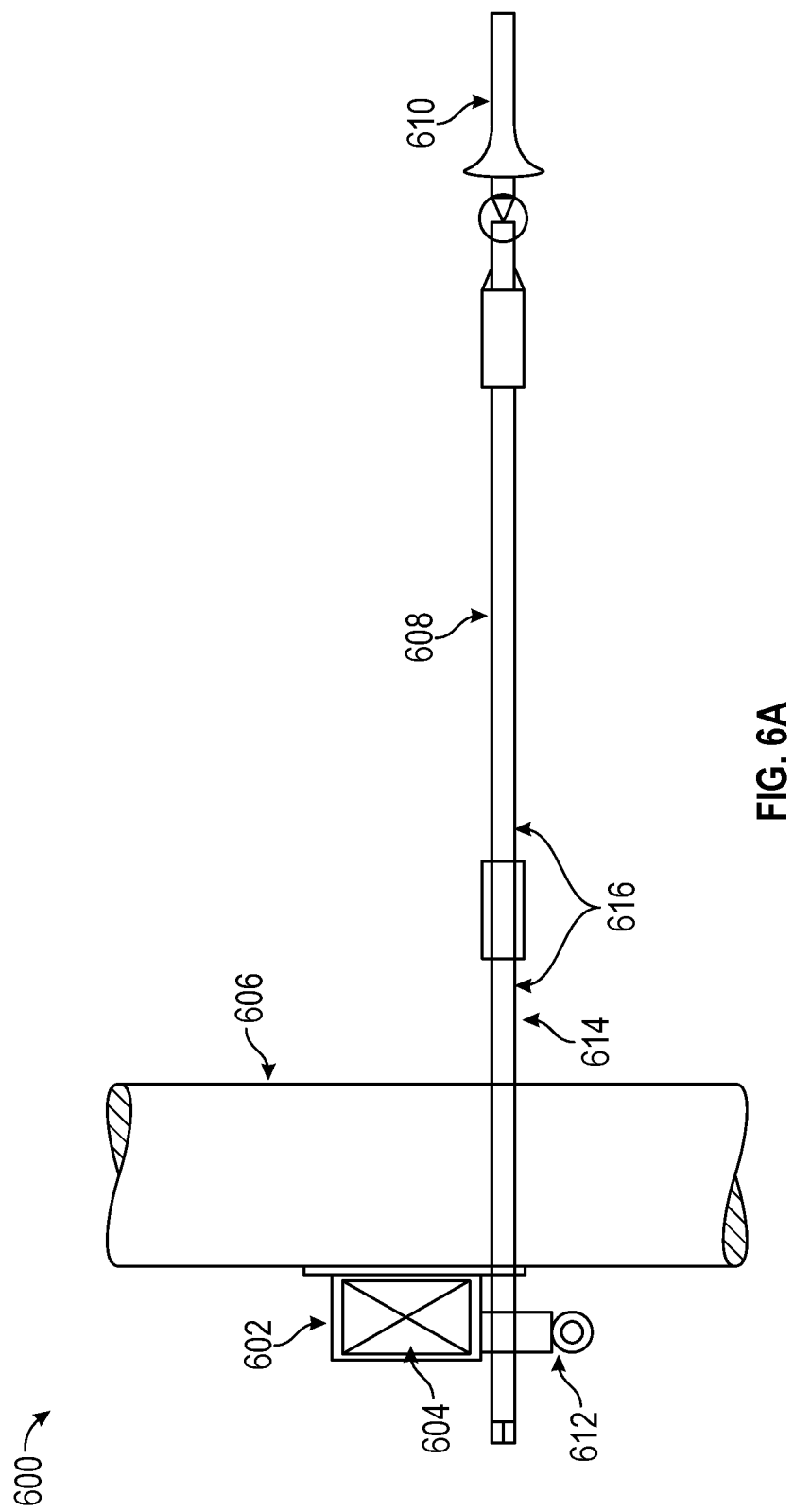
FIG. 6A depicts a wire tensioning system comprising a utility pole cross-arm mount and a connecting line relating to some embodiments.

Turning now to FIG. 6A, a wire tensioning system 600 relating to some of the embodiments is depicted. Wire tensioning system 600 is adapted to be manipulated by one or more robotic appendages. These robotic appendages may be attached to an aerial device, fixed to a vehicle, incorporated in a self-operating robot, incorporated in a flying device (e.g., a flying drone, quadcopter, or remote-control helicopter), or the like. In some embodiments, the robotic appendages are attached to a dielectric material (e.g., fiberglass, plastic, or rubber) which is in turn attached to an aerial device, fixed to a vehicle, incorporated in a self-operating robot, incorporated in a flying device, or the like. In some embodiments, the one or more robotic appendages may be fixed to a robotic assembly as depicted in FIG. 3. Additionally, the one or more robotic appendages may be fixed to an aerial device mounted on a vehicle as depicted in FIG. 1. In some embodiments wire tensioning system 600 is comprised of a tensioner 612, a connecting line 616, a mount 602, and a clamp 610. FIG. 6A contains some similar elements as FIG. 5 and FIG. 4, the common elements thereof will not be further described in detail.

Wire tensioning system 600, as displayed in FIG. 6A does not contain a supporting structure like supporting structure 408 in FIG. 4. Instead, some embodiments like wire tensioning system 600 use a connecting line adapted to provide structural support to the wire tensioning system. In some embodiments, connecting line 616 comprises a threaded section 614 and an insulated section 608. Alternatively, in some embodiments, connecting line 616 comprises only one of either a threaded section or an insulated section. Threaded section 614 may comprise a threaded rod, a linear gear, a toothed rod, or the like. Insulated section 608 may comprise a metal rod coated in an electrically insulating material, a metal rod with electrically insulating caps at both ends, a non-conductive plastic bar, a non-conductive hardened rubber bar, and the like. Insulated section 608 serves to electrically insulate the rest of wire tensioning system 600 from the electrical cable or conductor attached by clamp 610.

Tensioner 612 may comprise a gearbox adapted to interface with a threaded rod, linear gear, or toothed rod. In some embodiments, tensioner 612 comprises a worm gear interfacing with said threaded rod, linear gear, or toothed rod. In other embodiments, tensioner 612 may comprise a ratchet associated with a ratchet strap. As the wire tensioning system is adapted to be manipulated by one or more robotic appendages, tensioner 612 is adapted to be interfaced with one or more robotic appendages such that the tensioner is actuated by the robotic appendage. For example, tensioner 612 may interface with drilling tool 626 disposed on robotic appendage 622. Drilling tool 626 may interface with tensioner 612 such that the drilling action of drilling tool 626 is adapted to operate a gearbox within tensioner 612.

Figure 6B:
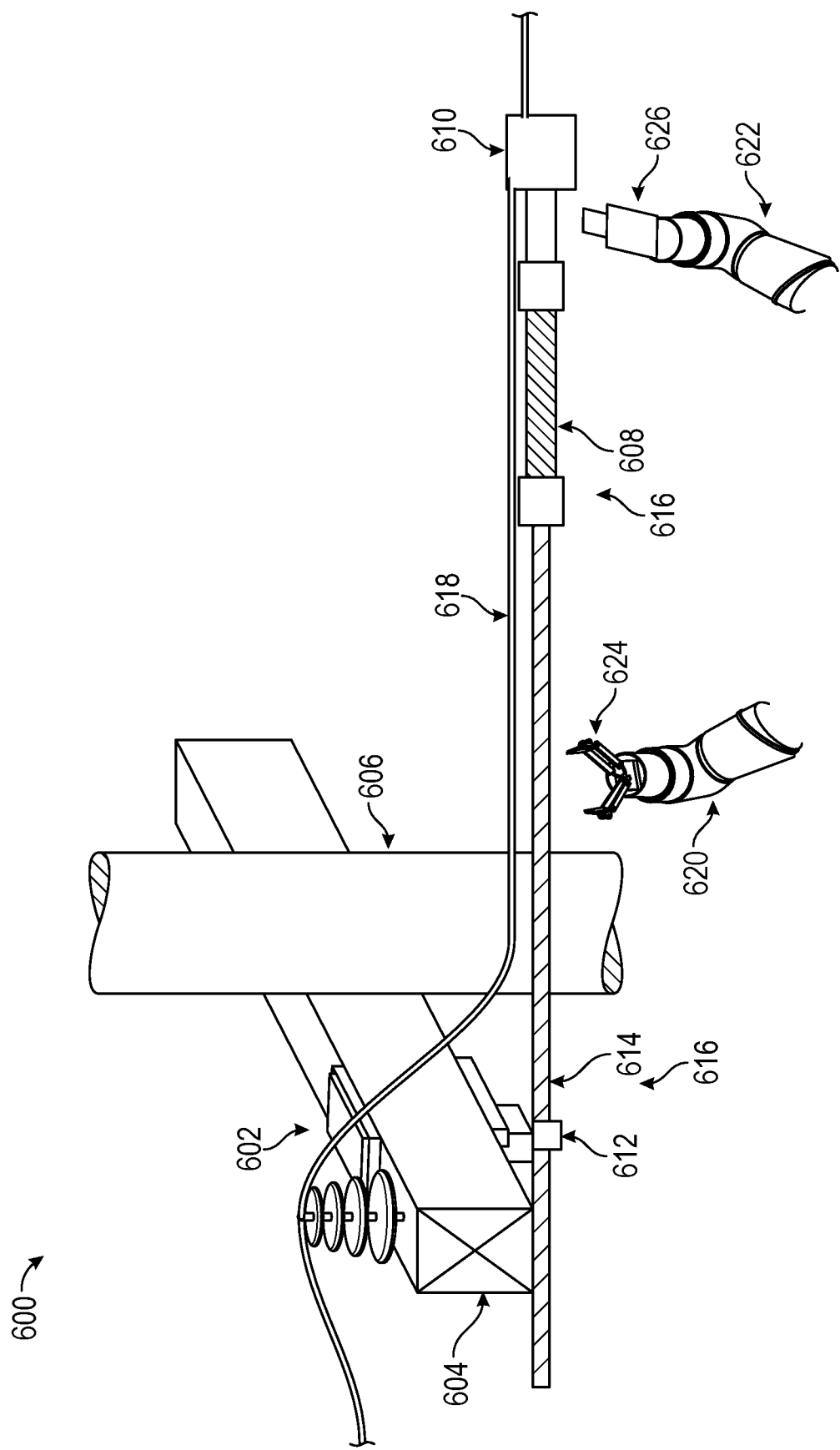
FIG. 6B depicts a wire tensioning system in an exemplary operational environment relating to some embodiments.

FIG. 6B displays wire tensioning system 600 in use. Wire tensioning system 600 is adapted to be manipulated by one or more robotic appendages such that the one or more robotic appendages may install, operate, and uninstall wire tensioning system 600. Wire tensioning system 600 comprises of the same elements as discussed in FIG. 6A and the common elements thereof will not be repeated.

FIG. 6B displays the wire tensioning system 600 of FIG. 6A in use on an electrical cable 618, also known as a conductor. Mount 602 is attached to utility pole cross-arm 604 upon which is a phase insulator that insulates cable 618 from the utility pole. Clamp 610 grips cable 618 as tensioner 612 draws connecting line 616 towards tensioner 612. This action adjusts the tension of the length of cable 618 past clamp 610 causing the length of cable 618 disposed between the utility pole cross arm and clamp 610 to become slack. This allows the one or more robotic appendages to operate on the slack cable, replacing, repairing, or any other alteration or modification thereof.

Figure 7:
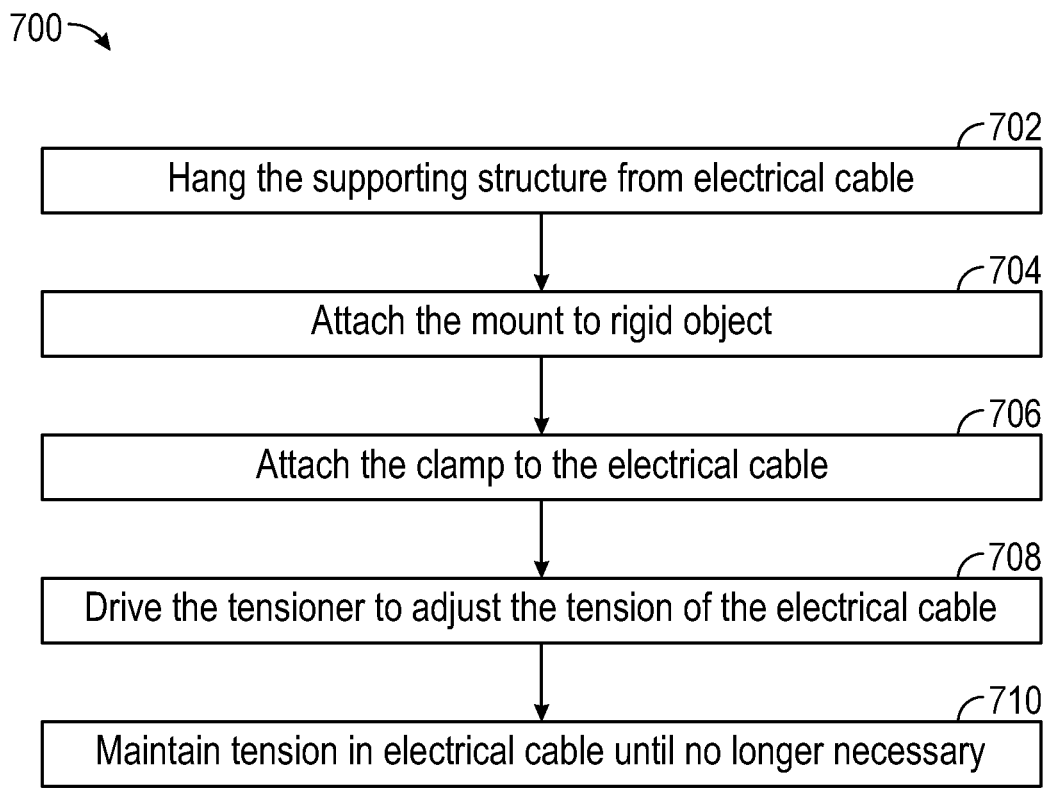
FIG. 7 depicts a method for installing and operating a wire tensioning system relating to some embodiments.

Turning now to FIG. 7, a method 700 of operating a wire tensioning system relating to some embodiments is depicted. Method 700 may comprise 5 steps, any of which may be reordered, removed, or added without departing the scope thereof. The steps may comprise; hanging the supporting structure from electrical cable 618, attaching the mount to a rigid object, attaching the clamp to the electrical cable 618, driving the tensioner to adjust the tension of an electrical cable 618, and maintaining the tension in an electrical cable 618. In some embodiments, method 700 may be reversed to uninstall a wire tensioning system. The method of uninstallation may comprise; releasing tension in an electrical cable 618, driving the tensioner to release tension in an electrical cable 618, detaching the clamp from an electrical cable 618, detaching the mount from a rigid object, and removing the supporting structure from the electrical cable 618. Each of these steps may comprise a multitude of different techniques and methods applied.

Wire tensioning system 400 will be used as an exemplary embodiment to depict the details of steps 702-710. In some embodiments, steps 702-710 and any further steps may be completed by one or more robotic appendages, or these steps may be completed by a lineman. Further still, embodiments are contemplated in which steps may be carried out using a combination of automated and manual techniques. Each step may be performed in any order without departing from the scope thereof. Additionally, the steps are not limited to wire tensioning system 400, they may be performed in any order on any embodiment of the wire tensioning system without departing the scope thereof.

At step 702, supporting structure 408 may be hanged from an electrical cable. This step may comprise robotic appendages 620 and 622 interfacing with supporting structure 408 and suspending the supporting structure 408 from an electrical cable, thereby suspending wire tensioning system 400 from said electrical cable. Step 702 may be reversed to remove supporting structure 408 from said electrical cable. Additionally, step 702 may comprise hanging supporting structure 408 from the electrical cable, then releasing any grip on the wire tensioning system and operating the wire tensioning system remotely via an electronic control system. Alternatively, Step 702 may comprise hanging supporting structure 408 from the electrical cable and maintaining grip on wire tensioning system 400 to secure the wire tensioning system 400 during operation. The method may then continue to any other step described. For example, the method may continue to step 704.

At step 704, mount 402 is fixed to a rigid object such as utility pole 606 or cross-arm 604. This step may comprise robotic appendages 620 and 622 interfacing with mount 402 and actuating the mount 402 to grip said rigid object. Specifically, grabbing tool 624 or drilling tool 626 may interface with the mount to actuate the mount 402 to grip said rigid object. Step 704 may be reversed to detach mount 402 from a rigid object. The method may then continue to any step described. For example, the method may continue to step 706.

At step 706, clamp 418 is attached to an electrical cable. This step may comprise robotic appendage 620 or 622 interfacing with clamp 418 such that grabbing tool 624 or drilling tool 626 actuates clamp 418 to attach to said electrical cable. Step 706 may be reversed to remove clamp 418 from said electrical cable. The method may then continue to any step described. For example, the method may continue to step 708.

At step 708, tensioner 414 is actuated to adjust the tension of connecting line 416. This step may comprise robotic appendages 620 or 622 interfacing with tensioner 414 such that tensioner 414 adjusts the tension of connecting line 416. The step may also comprise grabbing tool 624 or drilling tool 626 interfacing with tensioner 414 such that grabbing tool 624 or drilling tool 626 actuates tensioner 414 to adjust the tension of connecting line 416. Step 708 may be reversed to adjust the tension of connecting line 416 such that any tension applied to connecting line 416 may be removed by reversing the actuation of tensioner 414. The method may then continue to any step described. For example, the method may then continue to step 710.

At step 710, tensioner 414 remains in an actuated position such that the tension of connecting line 416 does not change after connecting line 416 has been tensioned, thereby maintaining the tension in the electrical cable. Step 710 may be reversed to stop maintaining tension in the electrical cable such that wire tensioning system 400 may be uninstalled and removed from operation.

In some embodiments, the wire tensioning systems 400, 500, 600, and any other such embodiments may further comprise an electronic control system (not shown) comprising, a battery module, one or more processors, computer readable memory, a wireless receiver, a wireless transmitter, motors for actuation of the tensioner and clamps, and a variety of sensors. For this description, the wire tensioning system 400, as shown in FIG. 4, will be used as an exemplary embodiment. This is not intended to limit the scope of this description and it is noted that all elements described in the following specification are applicable to any embodiment of the wire tensioning system described. In some such embodiments, the processor and other electronics are adapted to control tensioner 414 and clamp 418. In some embodiments, the electronic control system may be commanded by the user through a wireless network, or in other embodiments, the electronic control system may be commanded by the user through a wired network. In some such embodiments, one or more robotic appendages may place the wire tensioning system 400 on an electrical cable and connect clamp 418 to the electrical cable, then the user operating the robot may command the wire tensioning system 400 to actuate a motor that attaches the mount to a rigid object like utility pole 606 or cross-arm 604. The user may then command the wire tensioning system to actuate tensioner 414 to adjust the tension of connecting line 416, thereby tensioning the electrical cable. Additionally, some embodiments may further comprise a wire tension measurement system (not shown) communicatively coupled with the one or more processors such that the processor may receive tension information regarding the tension of the electrical cable and adjust the tension of connecting line 416 determined, at least in part, by the tension information received by the wire tension measurement system.

All figures and embodiments of the wire tensioning system as described above are exemplary and are not meant to limit the elements or scope of the wire tensioning system disclosed therein. Many embodiments will be apparent to those skilled in the art and may comprise any combination or rearrangement of the elements of the wire tensioning system as described.

The following U.S. patent applications, each filed Jul. 28, 2022, are each hereby incorporated by reference in their entirety as if set forth herein verbatim: U.S. Application Ser. No. 63/392,927, titled "REDUCING LATENCY IN HEAD-MOUNTED DISPLAY FOR THE REMOTE OPERATION OF MACHINERY"; U.S. application Ser. No. 17/875,674, titled "MANUAL OPERATION OF A REMOTE ROBOT ASSEMBLY"; U.S. application Ser. No. 17/875,710, titled "AUTONOMOUS AND SEMI-AUTONOMOUS CONTROL OF AERIAL ROBOTIC SYSTEMS"; U.S. application Ser. No. 17/875,743, titled "COOPERATIVE HIGH-CAPACITY AND HIGH-DEXTERITY MANIPULATORS"; U.S. application Ser. No. 17/875,796, titled "ROTARY TOOL FOR REMOTE POWER LINE OPERATIONS"; U.S. application Ser. No. 17/875,821, titled "OPERATION AND INSULATION TECHNIQUES"; U.S. application Ser. No. 17/875,893, titled "COORDINATE MAPPING FOR MOTION CONTROL"; U.S. application Ser. No. 17/875,990, titled "CROSS-ARM PHASE-LIFTER"; and U.S. Application Ser. No. 63/393,047, titled "ELECTRICALLY INSULATING BLANKET WITH MEMORY SET". The subject matter described in the foregoing U.S. patent applications may be combined with the subject matter of the present disclosure. For example, one or more embodiments, features, structures, acts, etc. described in any one or more of the foregoing U.S. patent applications may be combined with one or more embodiments, features, structures, acts, etc. described in the present disclosure.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

The invention claimed is:

1. A wire tensioning system for maintaining tension in an electrical cable and adapted to be manipulated by one or more robotic appendages, the wire tensioning system comprising:
 a connecting line adapted to provide structural support to the wire tensioning system;
 a first clamp disposed at a first end of the connecting line;
 a second clamp disposed at a second end of the connecting line; and
 a tensioner adapted to interface with the one or more robotic appendages such that the one or more robotic appendages operate the tensioner to adjust the tension of the electrical cable using the tensioner.

2. The wire tensioning system of claim 1, wherein the tensioner is disposed below the first clamp.

3. The wire tensioning system of claim 1, wherein the connecting line comprises:
 a non-insulated section disposed at the first end of the connecting line; and
 an insulated section disposed at the second end of the connecting line.

4. The wire tensioning system of claim 3, wherein the non-insulated section of the connecting line is configured to interface with the tensioner.

5. The wire tensioning system of claim 4, wherein the insulated section is coupled to the second clamp.

6. The wire tensioning system of claim 5, wherein the second clamp is configured to attach to the electrical cable.

7. The wire tensioning system of claim 1, wherein the tensioner comprises a hydraulic actuator.

8. The wire tensioning system of claim 7, wherein the hydraulic actuator is configured to provide a tensioning force between the first clamp and the second clamp.

9. A wire tensioning system for maintaining tension in an electrical cable and adapted to manipulated by one or more robotic appendages, the wire tensioning system comprising:
- a supporting structure adapted to be manipulated by the one or more robotic appendages;
- a first mount coupled to a first end of the supporting structure, the first mount adapted to be manipulated by the one or more robotic appendages;
- a second mount coupled to a second end of the supporting structure, the second mount adapted to be manipulated by the one or more robotic appendages; and
- a tensioner disposed along a length of the supporting structure, the tensioner adapted to be manipulated by the one or more robotic appendages.

10. The wire tensioning system of claim 9, wherein the tensioner is configured to apply a tensioning force to the supporting structure, the tensioning force drawing the first mount towards the second mount.

11. The wire tensioning system of claim 10, wherein the first mount is configured to be mounted to a utility pole.

12. The wire tensioning system of claim 11, wherein the second mount is configured to be mounted to a robotic appendage.

13. The wire tensioning system of claim 9, wherein the first mount is electrically isolated from the second mount.

14. The wire tensioning system of claim 13, wherein the tensioner is a hydraulic actuator configured to be driven by the one or more robotic appendages.

15. The wire tensioning system of claim 14, wherein the supporting structure comprises a fiberglass rod configured to interface with the tensioner.

16. A wire tensioning system for maintaining tension in an electrical cable and adapted to be manipulated by one or more robotic appendages, the wire tensioning system comprising:
- a supporting structure adapted to be manipulated by the one or more robotic appendages;
- a clamp disposed at a first end of the supporting structure, the clamp adapted to be manipulated by the one or more robotic appendages;
- a mount coupled to the supporting structure, the mount adapted to be manipulated by the one or more robotic appendages;
- a fastening mechanism disposed at a second end of the supporting structure, the fastening mechanism adapted to be manipulated by the one or more robotic appendages; and
- a tensioner disposed at the first end of the supporting structure, the tensioner adapted to be manipulated by the one or more robotic appendages.

17. The wire tensioning system of claim 16, wherein the tensioner comprises a hydraulic actuator.

18. The wire tensioning system of claim 16, wherein the tensioner is configured to draw the clamp towards the fastening mechanism.

19. The wire tensioning system of claim 16, wherein the supporting structure comprises a fiberglass rod.

20. The wire tensioning system of claim 16, wherein the fastening mechanism is configured to be coupled to a utility pole and the clamp is configured to couple to the electrical cable.

* * * * *